United States Patent
Shi et al.

(10) Patent No.: US 12,234,924 B2
(45) Date of Patent: Feb. 25, 2025

(54) ELECTROMAGNETIC VALVE AND ASSEMBLY METHOD THEREOF

(71) Applicant: ZHEJIANG SANHUA AUTOMOTIVE COMPONENTS CO., LTD., Zhejiang (CN)

(72) Inventors: Ying Shi, Zhejiang (CN); Liwei Wu, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 59 days.

(21) Appl. No.: 18/013,567

(22) PCT Filed: Jul. 8, 2021

(86) PCT No.: PCT/CN2021/105160
§ 371 (c)(1),
(2) Date: Dec. 29, 2022

(87) PCT Pub. No.: WO2022/007877
PCT Pub. Date: Jan. 13, 2022

(65) Prior Publication Data
US 2023/0341064 A1 Oct. 26, 2023

(30) Foreign Application Priority Data
Jul. 9, 2020 (CN) .......................... 202010654389.7

(51) Int. Cl.
*F16K 27/02* (2006.01)
*F16K 1/36* (2006.01)
(Continued)

(52) U.S. Cl.
CPC ............ *F16K 31/0655* (2013.01); *F16K 1/36* (2013.01); *F16K 1/42* (2013.01); *F16K 27/029* (2013.01); *F16K 31/0675* (2013.01)

(58) Field of Classification Search
CPC ............... F16K 27/029; F16K 31/0655; F16K 31/0675; Y10T 137/5987; Y10T 137/5196
(Continued)

(56) References Cited

U.S. PATENT DOCUMENTS

| | | | | |
|---|---|---|---|---|
| 5,094,264 A | * | 3/1992 | Miller | ................ F16K 31/0675 251/129.15 |
| 6,684,901 B1 | * | 2/2004 | Cahill | ................ F16K 31/0655 251/291 |
| 7,802,584 B2 | * | 9/2010 | Ricco | ................... F02M 61/168 251/129.16 |

(Continued)

FOREIGN PATENT DOCUMENTS

| CN | 2903617 Y | 5/2007 |
|---|---|---|
| CN | 209495004 U | 10/2019 |

(Continued)

OTHER PUBLICATIONS

International Search Report dated Oct. 9, 2021 for PCT Appl. No. PCT/CN2021/105160.
(Continued)

*Primary Examiner* — Matthew W Jellett
(74) *Attorney, Agent, or Firm* — Ohlandt, Greeley and Perle, L.L.P.

(57) ABSTRACT

An electromagnetic valve and an assembly method thereof. The electromagnetic valve includes a valve body, a coil assembly and a magnetizer, wherein at least part of the magnetizer is located between the coil assembly and the valve body. The electromagnetic valve includes a connecting member. The connecting member is used for connecting the magnetizer and the valve body. The coil assembly includes a first concave portion. The electromagnetic valve is provided with a containing portion. The coil assembly and the magnetizer are provided with at least two relative installa-
(Continued)

tion positions, and in at least one relative installation position, the limiting end of the connecting member is located in the containing portion.

10 Claims, 5 Drawing Sheets

(51) Int. Cl.
*F16K 1/42* (2006.01)
*F16K 31/06* (2006.01)
(58) Field of Classification Search
USPC .................................. 137/315.03; 251/129.15
See application file for complete search history.

(56) References Cited

U.S. PATENT DOCUMENTS

| | | | | |
|---|---|---|---|---|
| 7,938,383 B2 * | 5/2011 | Zur | ........................ | H01F 7/126 |
| | | | | 251/297 |
| 9,133,954 B2 | 9/2015 | Sato et al. | | |
| 9,670,879 B2 * | 6/2017 | Nakano | ................. | F16K 31/408 |
| 9,964,220 B1 * | 5/2018 | Ro | ....................... | F16K 31/0675 |
| 2010/0012869 A1 | 1/2010 | Hild et al. | | |
| 2015/0377376 A1 | 12/2015 | Lappan et al. | | |

FOREIGN PATENT DOCUMENTS

| | | |
|---|---|---|
| CN | 110410554 A | 11/2019 |
| CN | 210179036 U | 3/2020 |
| CN | 213451986 U | 6/2021 |
| EP | 2951477 A1 | 12/2015 |
| JP | 2003097757 A | 4/2003 |
| JP | 2018179120 A | 11/2018 |

OTHER PUBLICATIONS

Japanese Office Action dated Jan. 30, 2024 for Japanese Appl. No. 2022-578670.

* cited by examiner

ELECTROMAGNETIC VALVE AND ASSEMBLY METHOD THEREOF

This application is the national phase of International Patent Application No. PCT/CN2021/105160, titled "ELECTROMAGNIETIC VALVE AND ASSEMBLY METHOD THEREOF", filed on Jul. 8, 2021, which claims the priority to Chinese Patent Application No. 202010654389.7, titled "ELECTROMAGNETIC VALVE AND ASSEMBLY METHOD THEREOF", filed with the China National Intellectual Property Administration on Jul. 9, 2020, both of which are incorporated herein by reference.

BACKGROUND

1. Field of the Disclosure

The present application relates to the field of fluid control, and in particular to an electromagnetic valve.

2. Discussion of the Background Art

In the field of fluid control, the electromagnetic valve, as a control component for controlling the conduction of the flow path, includes a valve body, a coil assembly and a magnetic conductor. The coil assembly is fixed relative to the magnetic conductor, and the magnetic conductor is fixed to the valve body through external parts. How to reduce the volume of the electromagnetic valve is a technical problem to be solved.

SUMMARY

An object according to the application is to provide an electromagnetic valve which saves internal space and realizes the miniaturization of the electromagnetic valve.

An electromagnetic valve includes a valve body, a coil assembly and a magnetic conductor, where at least a part of the magnetic conductor is located between the coil assembly and the valve body; the electromagnetic valve includes a connector, and the connector connects the magnetic conductor with the valve body; the coil assembly includes a first recess, where the first recess forms a first opening on a lower wall of the coil assembly and a second opening on a side wall of the coil assembly, and the first opening faces an upper wall of the magnetic conductor; the electromagnetic valve has an accommodating portion, where a wall forming the accommodating portion includes an inner wall of the first recess and an upper wall of the magnetic conductor, the coil assembly and the magnetic conductor have at least two relative installation positions, where in at least one of the relative installation positions, a limiting end portion of the connector is located in the accommodating portion.

An assembly method of an electromagnetic valve, where the electromagnetic valve includes a valve body, a coil assembly, an iron core assembly, a valve seat, a sleeve, a valve core, a magnetic conductor and a connector. The coil assembly has a first through hole, and the magnetic conductor has a second through hole. The magnetic conductor further includes a lug portion, and the lug portion has a positioning hole.

The assembly method at least includes the following steps:

assembling the coil assembly with the magnetic conductor, so that the first through hole of the coil assembly is coaxial with the second through hole of the magnetic conductor;

assembling the iron core assembly, the valve seat, the sleeve and the valve core together, and then assembling them with the valve body;

passing the sleeve through the coaxial holes of the coil assembly and the magnetic conductor which are assembled together, then passing the connector through the positioning hole of the lug portion and connecting the connector with the valve body, the connector abutting against an upper wall of the lug portion; and turning the coil assembly along a radial direction of the coaxial holes, placing a first limiting portion in a second limiting portion, and placing the limiting end portion of the connector in the accommodating portion.

The electromagnetic valve disclosed in an embodiment of the present application includes a connector and an accommodating portion, where the magnetic conductor is connected with the valve body through the connector, and the limiting end portion of the connector can be accommodated in the accommodating portion, saving the internal space of the electromagnetic valve, reducing the volume of the electromagnetic valve, and facilitating the miniaturization of the electromagnetic valve.

DETAILED DESCRIPTION OF THE EMBODIMENTS

The present application is further illustrated hereinafter in conjunction with drawings and specific embodiments.

In the following description of the embodiments, in order to facilitate understanding, terms indicating directions (for example, "above", "below", etc.) are appropriately used, taking the electromagnetic valve in FIG. 2 as an example, it is defined that the coil assembly is located above the valve body, the valve body is located below the coil assembly, and an axial direction of the electromagnetic valve is the up-down direction.

Figure 1:
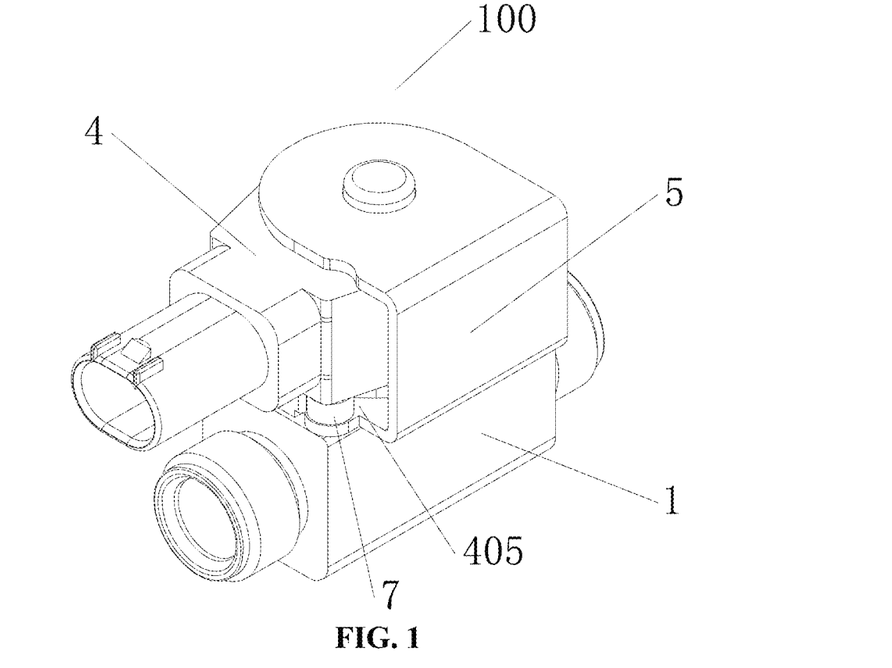
FIG. 1 is a schematic perspective view of an electromagnetic valve according to a technical solution of the present application.
Figure 2:
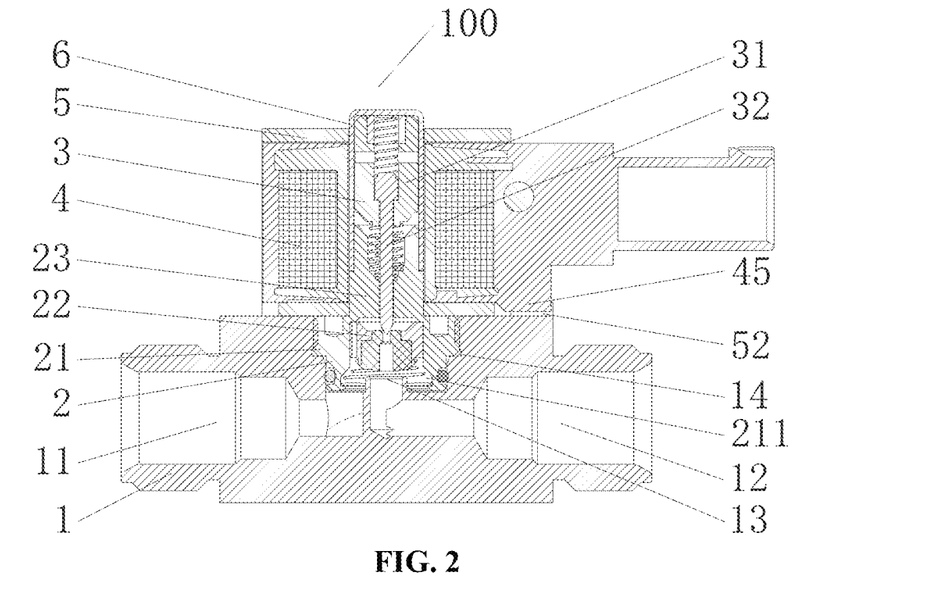
FIG. 2 is a schematic cross-sectional view of the electromagnetic valve according to a technical solution of the present application.

Referring to FIG. 1 and FIG. 2, an electromagnetic valve 100 includes a valve body 1, a valve assembly 2, an iron core assembly 3, a coil assembly 4 and a magnetic conductor 5, where at least part of the valve assembly 2 is located in an inner cavity of the valve body 1, at least part of the iron core assembly 3 is located above the valve assembly 2, and at least part of the iron core assembly 3 is located in an inner periphery of the coil assembly 4, where the coil assembly 4 and the magnetic conductor 5 are position-limited relative to each other, and the coil assembly 4 and the magnetic conductor 5 are sleeved on the outer periphery of part of the valve assembly 2 and part of the iron core assembly 3; the magnetic conductor 5 surrounds part of the coil assembly 4, and along the axial direction of the electromagnetic valve 100, at least part of the magnetic conductor 5 is located between the coil assembly 4 and the valve body 1. The electromagnetic valve 100 further includes a connector 7, where the connector 7 connects the magnetic conductor 5 with the valve body 1.

The valve assembly 2 includes a valve seat 21, a valve core 22 and a suction portion 23. The suction portion 23 is located above the valve seat 21. In this embodiment, the suction portion 23 is integrated with the valve seat 21. In other embodiments, the suction portion 23 and the valve seat 21 may be provided separately, and then fixed to each other by welding, bonding or threading. The valve body 1 has a hole 14 for accommodating at least part of the valve seat 21. The valve seat 21 is fixed relative to the valve body 1, and the fixing method may be welding or screw connection. In this embodiment, the valve seat 21 is screwed to the valve body 1. The electromagnetic valve 100 is further provided with a valve cavity 211, where the valve cavity 211 is located between the valve body 1 and the valve seat 21, and the valve core 22 is located in the valve cavity 211 and is movable along the axial direction of the valve assembly 2 in the valve cavity 211. The electromagnetic valve 100 further includes a sleeve 6. One end of the sleeve 6 is fixedly connected with the valve assembly 2 and sealed at the connection. Specifically, the inner wall of the sleeve 6 is fixed to the outer wall of the suction portion 23, and the fixing method may be other methods such as welding or bonding. The iron core assembly 3 includes a movable iron core 31 and a valve stem 32. Along the axial direction of the iron core assembly 3, the movable iron core 31 is located above the suction portion 23 and is located in the inner cavity of the sleeve 6. One end of the valve stem 32 is limited to the movable iron core 31, and the other end of the valve stem 32 may be in contact with the valve core 22; the movable iron core 31 is movable in the sleeve 6 along the axial direction of the iron core assembly 3, and the movable iron core 31 can further drive the valve stem 32 to move along the axial direction of the iron core assembly 3, so that the valve stem 32 contacts or separates from the valve core 22.

Figure 3:
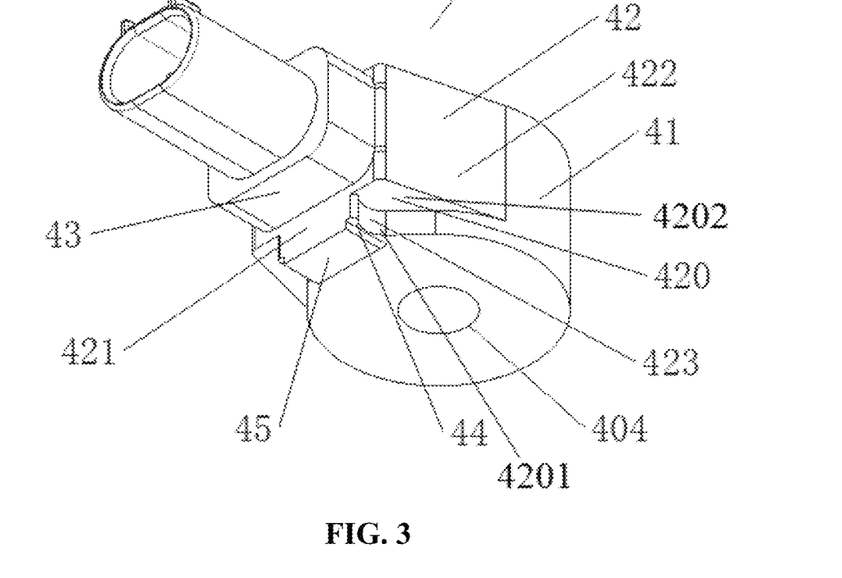
FIG. 3 is a schematic perspective view of a first embodiment of a coil assembly.
Figure 4:
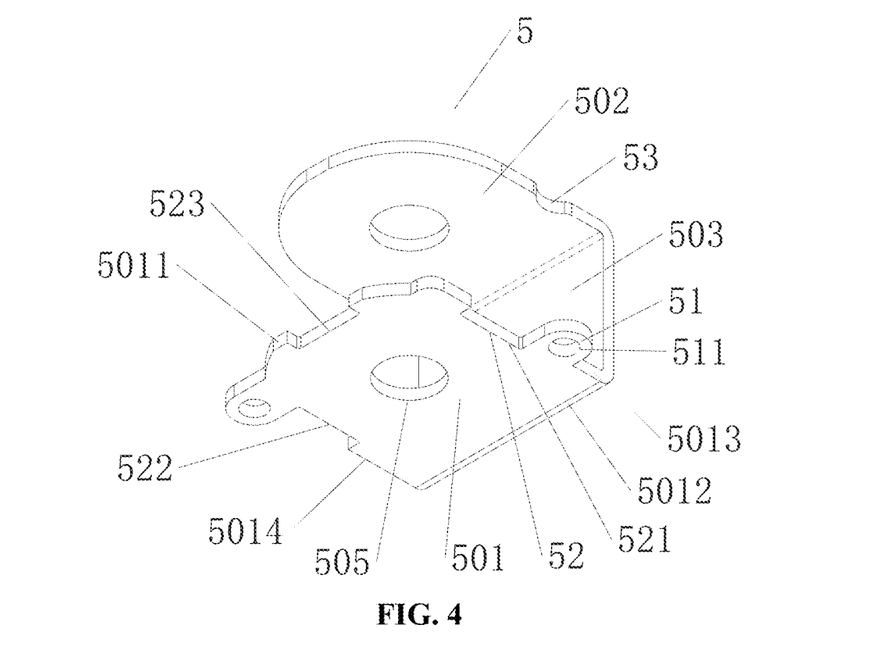
FIG. 4 is a schematic perspective view of a first embodiment of a magnetic conductor.

Referring to FIG. 2, the coil assembly 4 and the magnetic conductor 5 are each provided with a through hole. Specifically, as shown in FIG. 3, the coil assembly 4 has a first through hole 404. As shown in FIG. 4, the magnetic conductor 5 has a second through hole 505. Along the axial direction of the sleeve 6, the first through hole 404 penetrates through the upper and lower surfaces of the coil assembly 4, and the second through hole 505 penetrates through the upper and lower surfaces of the magnetic conductor 5. The axes of the first through hole 404 and the second through hole 505 are coincident, that is, the first through hole 404 and the second through hole 505 are coaxially arranged. Part of the sleeve 6 is located in the first through hole 404 and the second through hole 505. The valve body 1 is formed with a first channel 11, a second channel 12 and a valve port 13. The first channel 11 is communicated with the valve cavity 211, and the valve port 13 is communicated with the second channel 12. The working medium can enter the valve cavity 211 from the first channel 11, and when the valve core 22 leaves the valve port 13, the working medium enters the second channel 12 through the valve port 13. When the electromagnetic valve 100 is energized or de-energized, the movable iron core 31 can drive the valve stem 32 to move along the axial direction of the iron core assembly 3, and the valve stem 32 then causes the valve core 22 to move in the valve cavity 211 in the up-down direction of the valve assembly 2, thereby opening or closing the valve port 13.

Figure 5:
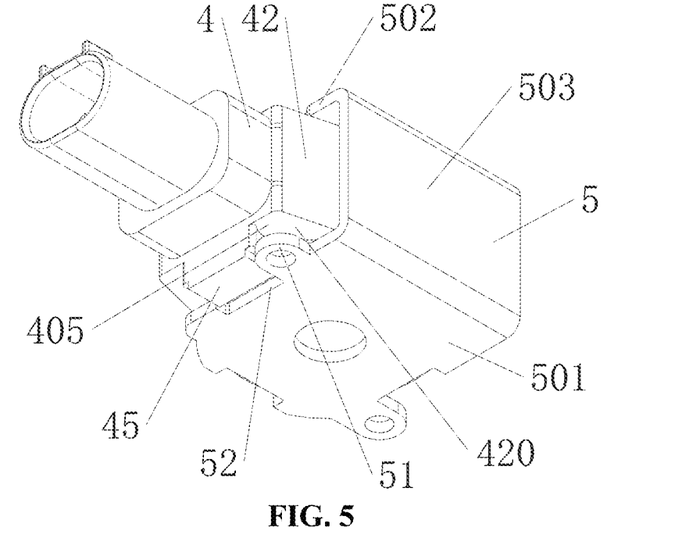
FIG. 5 is a schematic perspective view of an embodiment of an assembly of the coil assembly and the magnetic conductor.
Figure 6:
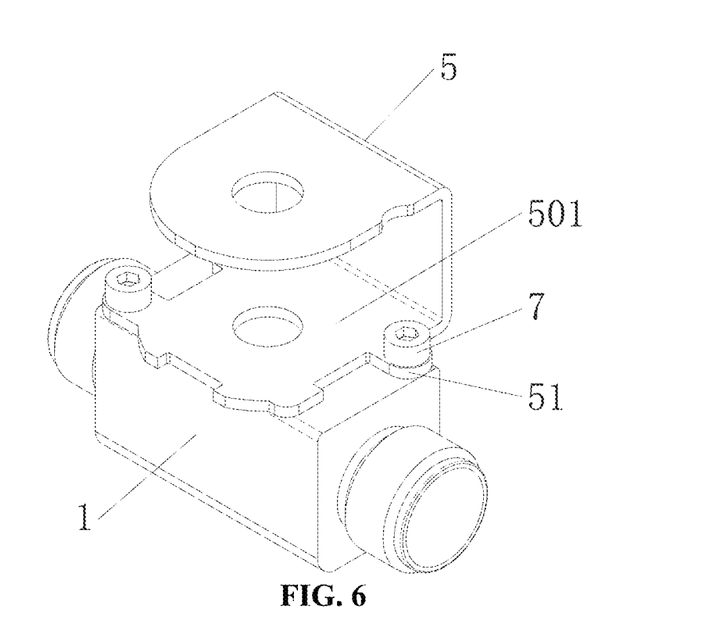
FIG. 6 is a schematic perspective view of an embodiment of an assembly of the magnetic conductor and a valve body.

Referring to FIG. 3, FIG. 4, FIG. 5 and FIG. 6, the coil assembly 4 includes a main body portion 41, a connecting portion 42 and an interface portion 43, where the coil of the coil assembly 4 is located in the main body portion 41, and the main body portion 41, the connecting portion 42 and the interface portion 43 are integrated. For example, the main body portion 41, the connecting portion 42 and the interface portion 43 may be injection-molded into one body. The interface portion 43 is raised relative to a side wall of the connecting portion 42. Specifically, the connecting portion 42 includes a first side wall 421 and a second side wall 422, where the first side wall 421 and the second side wall 422 intersect. The first through hole 404 is specifically formed in the main body portion 41, and the first through hole 404 has openings on the upper and lower surfaces of the main body portion 41. Along the axial direction of the first through hole 404, a lower wall of the main body portion 41 is closer to the valve body 1 than the first side wall 421 and the second side wall 422. The interface portion 43 is raised relative to the first side wall 421. The magnetic conductor 5 includes a first plate body 501, a second plate body 502 and a third plate body 503. The first plate body 501, the second plate body 502 and the third plate body 503 are integrally formed or welded together. The first plate body 501 and the second plate body 502 are arranged in parallel or approximately parallel, and the third plate body 503 is perpendicular or substantially perpendicular to the first plate body 501 and the second plate body 502. Along the axial direction of the electromagnetic valve 100, the third plate body 503 is located between the first plate body 501 and the second plate body 502, the first plate body 501 is located below the second plate body 502, or in other words, the first plate body 501 is closer to the valve body 1 than the second plate body 502, and the third plate body 503 connects the first plate body 501 with the second plate body 502. The second through hole 505 is specifically formed in the first plate body 501 and the second plate body 502, and the second through hole 505 has openings on the upper and lower surfaces of the first plate body 501 and the upper and lower surfaces of the second plate body 502. Along the axial direction of the first through hole 404, at least part of the coil assembly 4 is located between the first plate body 501 and the second plate body 502. Specifically, the main body portion 41 abuts against the upper surface of the first plate body 501 and the lower surface of the second plate body 502. Thus, the coil assembly 4 and the magnetic conductor 5 are position-limited relative to each other in the axial direction. In addition, along the axial direction of the electromagnetic valve 100, the first plate body 501 is located between the coil assembly 4 and the valve body 1. The first plate body 501 abuts against the valve body 1, which facilitates the assembly of the magnetic conductor 5 with the valve body 1, as shown in FIG. 6.

Figure 10:
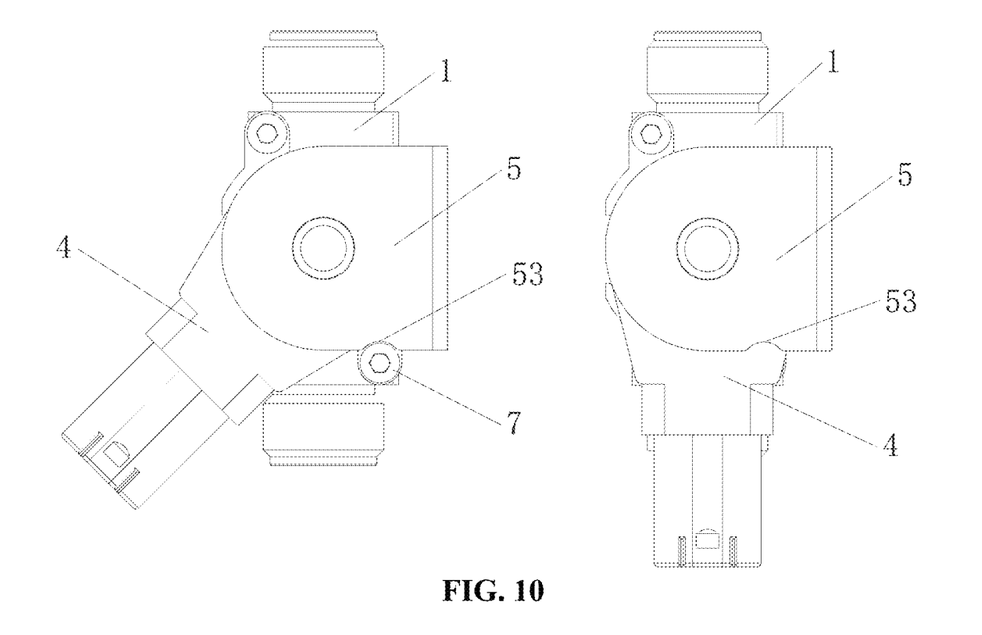
FIG. 10 is a schematic structural view of two assembling positions of the electromagnetic valve according to a technical solution of the present application.

Referring to FIG. 4 and FIG. 6, the magnetic conductor 5 includes a lug portion 51. The lug portion 51 is located at the first plate body 501. In this embodiment, the lug portion 51 is integrally formed with the first plate body 501. Specifically, the first plate body 501 includes a first end portion 5011, a second end portion 5012, a first side portion 5013, and a second side portion 5014. The first end portion 5011 is a free end, the second end portion 5012 is connected to the third plate body 503. Along a vertical direction of the third plate body 503, the first side portion 5013 and the second side portion 5014 are both located between the first end portion 5011 and the second end portion 5012. The first side portion 5013 and the second side portion 5014 are respectively located on two sides of the first end portion 5011. The lug portion 51 is located on the first side portion 5013 and/or the second side portion 5014. The lug portion 51 protrudes from the first side portion 5013 and/or the second side portion 5014 of the first plate body 501. The lug portion 51 has a positioning hole 511, where the positioning hole 511 has openings on the upper and lower surfaces of the lug portion 51, and the positioning hole 511 is a through hole. The connector 7 may be a screw. Correspondingly, the valve body 1 has a threaded hole, and the positioning hole 511 of the lug portion 51 is coaxial with the threaded hole of the valve body 1. The connector 7 passes through the positioning hole 511 from above the lug portion 51 and extends into the threaded hole of the valve body 1 to form a threaded connection with the valve body 1. The connector 7 has two ends, which are the limiting end portion of the connector 7 and the connecting end portion of the connector 7, respectively. The limiting end portion of the connector 7 is located above the lug portion 51 and abuts against the upper wall of the lug portion 51, and at least part of the connecting end portion of the connector 7 is located in the positioning hole 511 and screwed to the valve body 1, so that the lug portion 51 is fixed to the valve body 1, which is beneficial to the limiting and fixing of the magnetic conductor 5 relative to the valve body 1. The magnetic conductor 5 and the valve body 1 are connected by the connector 7, and there is no need to separately provide a mechanical connecting part for limiting the magnetic conductor, so the structure is simpler. A notch portion 53 is formed in the second plate body 502 corresponding to the lug portion 51. The notch portion 53 has openings on the upper and lower surfaces and the side wall surface of the second plate body 502. The notch portion 53 is recessed relative to the upper and lower surfaces and the side wall of the second plate body 502. The notch portion 53 is formed into a notch-like structure, which facilitates the installation of the connector 7 and makes the structure of the electromagnetic valve 100 more compact, as shown in FIG. 4 and FIG. 10.

Figure 7:
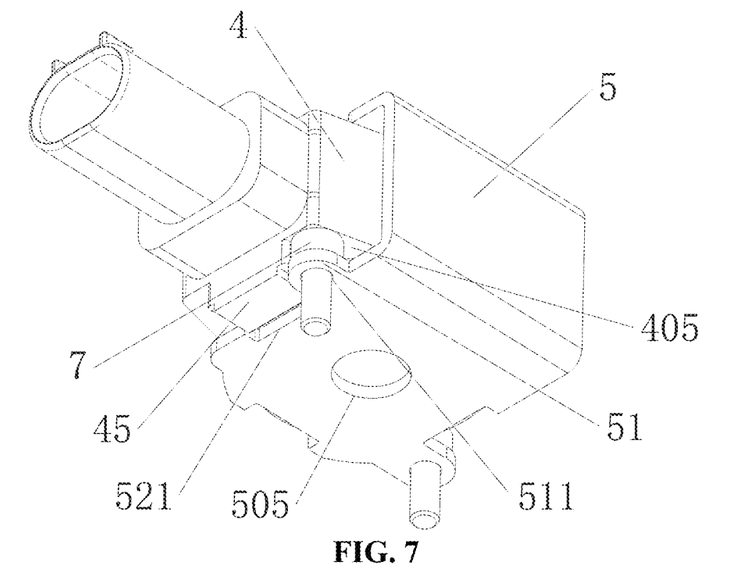
FIG. 7 is a schematic perspective view of an embodiment of an assembly of a connector and an accommodating portion.

Referring to FIG. 3 and FIG. 5, the electromagnetic valve 100 has an accommodating portion 405. The wall forming the accommodating portion 405 includes the inner wall of the first recess 420 and the upper wall of the magnetic conductor 5, and the limiting end portion of the connector 7 is located in the accommodating portion 405. Specifically, the coil assembly 4 includes a first recess 420, where the first recess 420 is formed in the connecting portion 42. The first recess 420 is recessed inward from the second side wall 422 of the connecting portion 42. The first recess 420 forms openings on the lower wall and the side wall of the connecting portion 42. The first recess 420 is located between the first side wall 421 and the first through hole 404 along a vertical direction of the surface where the first side wall 421 is located, or in other words, along a vertical direction of the first side wall 421. In this embodiment, the first recess 420 has two openings, which are the first opening 4201 and the second opening 4202, respectively. The first opening 4201 of the first recess 420 is formed on the lower wall of the connecting portion 42, and the second opening 4202 of the first recess 420 is formed on the second side wall 422. The first opening 4201 communicates with the second opening 4202, as shown in FIG. 3. The first opening 4201 of the first recess 420 faces the upper wall of the lug portion 51, so that the lug portion 51 relatively closes the first opening 4201 of the first recess 420. The area enclosed by the inner wall of the first recess 420 and the upper wall of the lug portion 51 forms the cavity of the accommodating portion 405. The wall forming the accommodating portion 405 includes the inner wall of the first recess 420 and the upper wall of the lug portion 51, as shown in FIG. 5. The connector 7 passes through the positioning hole 511 of the lug portion 51 and is connected to the valve body 1. The coil assembly 4 is turned so that the limiting end portion of the connector 7 can be located in the accommodating portion 405 through the second opening 4202 of the first recess 420. As shown in FIG. 7, the coil assembly 4 is provided with the first recess 420, so that the limiting end portion of the connector 7 is located in the accommodating portion 405, which is beneficial to reducing the overall volume of the electromagnetic valve 100, simplifying the structure and reducing the cost, as shown in FIG. 1.

Referring to FIG. 3, FIG. 4 and FIG. 5, the coil assembly 4 includes a first limiting portion 45, and the magnetic conductor 5 includes a second limiting portion 52. In one embodiment, the first limiting portion 45 is a protrusion, and the second limiting portion 52 is a recess. Along the axial direction of the first through hole 404, the first limiting portion 45 protrudes from the lower wall of the connecting portion 42 toward the first plate body 501. Specifically, the first recess 420 further includes a third side wall 423. Along the axial direction of the first through hole 404, the third side wall 423 is located below the second side wall 422, and the third side wall 423 is closer to the axis of the first through hole 404 than the second side wall 422. The third side wall 423 is opposite to the second opening of the first recess 420, and the third side wall 423 intersects with the first side wall 421. The main body portion 41 includes a first base portion 44, where the wall forming the first base portion 44 includes the first side wall 421, the third side wall 423 and the lower wall of the connecting portion 42. Along the axial direction of the first through hole 404, the first base portion 44 is located below the interface portion 43, or in other words, the first base portion 44 is closer to the magnetic conductor 5 than the interface portion 43. The first limiting portion 45 is specifically located at the first base portion 44, and the first limiting portion 45 protrudes from the lower wall of the first base portion 44 and toward the first plate body 501. The second limiting portion 52 is formed at the first plate body 501, and the wall forming the second limiting portion 52 includes the wall of the lug portion 51, or in other words, the second limiting portion 52 is adjacent to the lug portion 51. The second limiting portion 52 has an opening on the upper surface of the first plate body 501, and the second limiting portion 52 is recessed relative to the upper wall of the first plate body 501. The first limiting portion 45 is located in the second limiting portion 52, and the second limiting portion 52 is in clearance fit with the first limiting portion 45. In this way, the first limiting portion 45 and the second limiting portion 52 cooperate with each other so that the coil assembly 4 cannot rotate in the radial direction relative to the magnetic conductor 5. In addition, because the coil assembly 4 and the magnetic conductor 5 form a limit in the axial direction, it is beneficial for the coil assembly 4 and the magnetic conductor 5 to limit and fix each other, as shown in FIG. 5.

Figure 8:
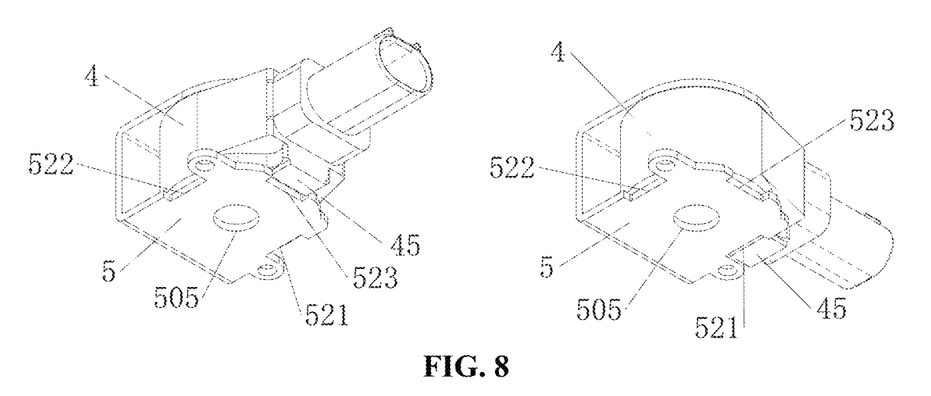
FIG. 8 is a schematic perspective view of two different assemblies of the coil assembly and the magnetic conductor.

Referring to FIG. 4, FIG. 7 and FIG. 8, the coil assembly 4 and the magnetic conductor 5 have at least two relative installation positions. In this embodiment, the number of the second limiting portions 52 is three. The second limiting portions 52 are distributed along the circumferential direction of the magnetic conductor 5 to form three sub-portions, which are a first sub-portion 521, a second sub-portion 522 and a third sub-portion 523, respectively. Specifically, the first sub-portion 521 of the second limiting portions 52 is formed on the first side portion 5013, the second sub-portion 522 is formed on the second side portion 5014, and the third sub-portion 523 is formed on the first end portion 5011. The first sub-portion 521 and the second sub-portion 522 are adjacent to the lug portion 51. Along a vertical direction of the third plate body 503, at least one lug portion 51 is closer to the third plate body 503 than the first sub-portion 521 or the second sub-portion 522. In this way, when the coil assembly 4 is turned, it is advantageous for the limiting end portion of the connector 7 to be located in the accommodating portion 405 through the second opening of the first recess 420. The number of the first limiting portion 45 is one. The first limiting portion 45 cooperates with the different second limiting portions 52, which can change the relative installation position of the coil assembly 4 and the magnetic conductor 5 in the radial direction, so that the interface portion 43 can be fixed toward different directions, which is beneficial for the electromagnetic valve 100 to adapt to different installation situations, as shown in FIG. 8. The first limiting portion 45 is located in the first sub-portion 521 of the second limiting portion 52. When the coil assembly 4 and the magnetic conductor 5 are located in this installation position, the limiting end portion of the connector 7 is located in the accommodating portion 405, as shown in FIG. 7. In this embodiment, each second limiting portion 52 has openings on the upper and lower surfaces and the sidewall surface of the first plate body 501. Each second limiting portion 52 is recessed relative to the upper and lower surfaces and the sidewall surface of the first plate body 501, and each second limiting portion 52 is formed into a notch-like structure, as shown in FIG. 4. In other embodiments, the second limiting portion 52 may only have openings on the upper surface and the lower surface of the first plate body 501, and the second limiting portion 52 is formed as a through-hole structure; or, the second limiting portion 52 may only have an opening on the upper surface of the first plate body 501, that is, the second limiting portion 52 is formed as a blind hole structure, which is not described in detail herein. In other embodiments, the first limiting portion 45 may also be formed as a recess, and correspondingly, the second limiting portion 52 may be formed as a protrusion, and the cooperation of the first limiting portion 45 and the second limiting portion 52 can also prevent the coil assembly 4 from rotating relative to the magnetic conductor 5 in the radial direction, which is not described in detail herein.

In this embodiment, referring to FIG. 3, FIG. 4 and FIG. 7, along the radial direction of the coil assembly 4, the first recess 420 is located on one side of the first base portion 44, and the wall forming the first recess 420 includes the side wall of the first base portion 44. The lug portion 51 is closer to the third plate body 503 than the second limiting portion 52 in a vertical direction of the third plate body 503. In this way, when the first limiting portion 45 is located in the first sub-section 521 of the second limiting portions 52, the first recess 420 may face the lug portion 51, which is beneficial to the combination of the first recess 420 and the lug portion 51 to form the accommodating portion 405, and is also beneficial for the limiting end portion of the connector 7 to be located in the accommodating portion 405 through the second opening of the first recess 420, and which facilitates the installation of the coil assembly 4 and the magnetic conductor 5.

Figure 9:
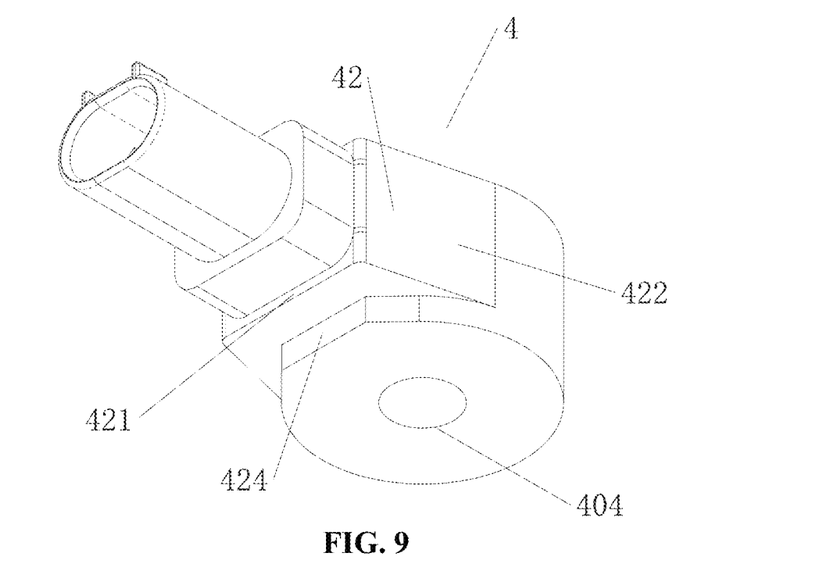
FIG. 9 is a schematic perspective view of a second embodiment of the coil assembly.

In another embodiment, the first limiting portion may also be located on the upper wall of the connecting portion. Along the axial direction of the first through hole, the first limiting portion protrudes from the upper wall of the connecting portion toward the second plate body. Correspondingly, the second limiting portion is formed at the second plate body of the magnetic conductor. The second limiting portion is recessed relative to the lower wall of the second plate body, and the second limiting portion has an opening on the lower surface of the second plate body. In this case, the cooperation of the first limiting portion and the second limiting portion can also prevent the coil assembly from rotating relative to the magnetic conductor 5 in the radial direction. In this embodiment, referring to FIG. 9, the first recess 420 further includes a fourth side wall 424. Along the circumferential direction of the first through hole 404, the fourth side wall 424 is closer to the first through hole 404 than the first side wall 421. Along the axial direction of the first through hole 404, the fourth side wall 424 is located below the first side wall 421 and the second side wall 422. The second opening of the first recess 420 penetrates through the side wall of the connecting portion 42, so that the coil assembly 4 may not be interfered by the first base portion 44 when adjusting the radial relative position to the magnetic conductor 5, thereby improving the installation efficiency of the electromagnetic valve 100.

Referring to FIG. 10, an assembly method of the electromagnetic valve 100 is provided, including at least the following steps:

S1, assembling the coil assembly 4 with the magnetic conductor 5, so that the first through hole 404 of the coil assembly 4 is coaxial with the second through hole 505 of the magnetic conductor 5;

S2, assembling the iron core assembly 3, the valve seat 21, the sleeve 6 and the valve core 22 together, and then assembling them with the valve body 1;

S3, passing the sleeve 6 through the coaxial holes of the coil assembly 4 and the magnetic conductor 5 which are assembled together in step S1, then passing the connector 7 through the positioning hole 511 of the lug portion 51 and connecting the connector 7 with the valve body 1, the connector 7 abutting against an upper wall of the lug portion 51; and S4, turning the coil assembly 4 along a radial direction of the coaxial holes, placing the first limiting portion 45 in the second limiting portion 52, and placing the limiting end portion of the connector 7 in the accommodating portion 405.

The technical features of the above embodiments can be combined at will. In order to make the description concise, all possible combinations of the technical features in the above embodiments are not described. However, as long as there is no contradiction in the combinations of these technical features, these combinations should be considered to be within the scope recorded in this specification.

The above embodiments are only intended to illustrate the present application rather than limit the technical solutions described in the present application. Although the present specification has been described in detail with reference to the embodiments described above, it should be understood by those skilled in the art that, various modifications or equivalent substitutions can be made to the technical solutions of the present application by those skilled in the art, and all technical solutions and improvements that do not depart from the spirit and scope of the present application should be included within the scope of the claims of the present application.

What is claimed is:

1. An electromagnetic valve, comprising a valve body, a coil assembly and a magnetic conductor, wherein at least part of the magnetic conductor is located between the coil assembly and the valve body; wherein the electromagnetic valve comprises a connector, and the connector is configured to connect the magnetic conductor with the valve body; wherein the connector comprises a limiting end portion and a connecting end portion; wherein the coil assembly comprises a main body portion, a connecting portion, an interface portion and a first recess, wherein the connecting portion comprises a first side wall and a second side wall, the first side wall intersects the second side wall, and the interface portion protrudes from the first side wall; wherein the first recess is formed on the connecting portion, the first recess is recessed relative to a lower wall of the connecting portion to form a first opening and is recessed relative to the second side wall of the connecting portion to form a second opening, and the first opening faces an upper wall of the magnetic conductor; wherein the electromagnetic valve has an accommodating portion, wherein a wall forming the accommodating portion comprises an inner wall of the first recess and the upper wall of the magnetic conductor, wherein the coil assembly and the magnetic conductor have at least two relative installation positions, wherein in at least one of the relative installation positions, the limiting end portion of the connector is located in the accommodating portion, and at least part of the connecting end portion of the connector extends into the valve body to be connected to the valve body;

wherein the coil assembly comprises first limiting portion, the magnetic conductor comprises a second limiting portion, and the first limiting portion is located at the second limiting portion;

wherein the magnetic conductor comprises a first plate body, a second plate body and a third plate body, and the third plate body is configured to connect the first plate body with the second plate body, wherein along an axial direction of a first through hole of the main body portion, at least part of the first plate body is located between the valve body and the coil assembly, wherein the coil assembly abuts against a lower wall of the second plate body and an upper wall of the first plate body;

wherein the first plate body comprises a lug portion, and the connector is directed through a hole of the lug portion, wherein at least part of the connecting end portion of the connector is connected with the valve body to fix the lug portion, and the upper wall of the magnetic conductor for forming the accommodating portion is an upper wall of the lug portion;

wherein the first recess comprises a third side wall, wherein along the axial direction of the first through hole, the third side wall is located below the second side wall, wherein the third side wall is closer to the axis of the first through hole than the second side wall, wherein the third side wall is opposite to the second opening, and the third side wall intersects with the first side wall; wherein the main body portion comprises a first base portion, and a wall forming the first base portion comprises the first side wall, the third side wall and the lower wall of the connecting portion; and wherein the first limiting portion is formed as a protrusion, the second limiting portion is formed as a recess, and the first limiting portion is formed on the first base portion, wherein along the axial direction of the first through hole, the first limiting portion protrudes toward the first plate body from a lower wall of the first base portion; wherein the second limiting portion is formed on the first plate body, and the second limiting portion is recessed relative to the upper wall of the first plate body, wherein the second limiting portion has an opening on an upper surface of the first plate body, and a wall forming the second limiting portion comprises a wall of the lug portion.

2. The electromagnetic valve according to claim 1, wherein the main body portion, the connecting portion and the interface portion are of an integrated structure and the limiting end portion of the connector is located in the accommodating portion through the second opening;

wherein the main body portion comprises the first through hole, and a sleeve of the electromagnetic valve is accommodated in the first through hole; wherein along a vertical direction of the first side wall, the first recess is located between the first side wall and the first through hole.

3. The electromagnetic valve according to claim 2, wherein the first plate body comprises a first end portion, a second end portion, a first side portion and a second side portion, wherein the first end portion is a free end, the second end portion is connected to the third plate body, wherein along a vertical direction of the third plate body, the first side portion and the second side portion are located between the first end portion and the second end portion, wherein the first plate body comprises a second through hole, the second through hole accommodates the sleeve, and the second through hole is coaxial with the first through hole.

4. The electromagnetic valve according to claim 3, wherein the second limiting portion comprises three sub-portions, wherein a first sub-portion of the second limiting portion is formed on the first side portion, a second sub-portion of the second limiting portion is formed on the second side portion, and a third sub-portion of the second limiting portion is formed on the first end portion;

wherein the lug portion is formed on the first side portion and/or the second side portion, wherein along the vertical direction of the third plate body, at least one of the lug portions is closer to the third plate body than the second limiting portion.

5. The electromagnetic valve according to claim 1, wherein the second plate body has a notch portion, wherein the notch portion has openings on upper and lower surfaces and a side wall surface of the second plate body, wherein the notch portion is recessed relative to the upper and lower surfaces and the side wall of the second plate body.

6. An assembly method of the electromagnetic valve according to claim 1, wherein the electromagnetic valve comprises a valve body, a coil assembly, an iron core assembly, a valve seat, a sleeve, a valve core, a magnetic conductor and a connector, wherein the coil assembly has a first through hole, and the magnetic conductor has a second through hole, wherein the magnetic conductor further comprises a lug portion, and the lug portion has a positioning hole;

wherein the assembly method at least comprises the following steps:

assembling the coil assembly with the magnetic conductor, so that the first through hole of the coil assembly is coaxial with the second through hole of the magnetic conductor;

assembling the iron core assembly, the valve seat, the sleeve and the valve core together, and then assembling them with the valve body;

passing the sleeve through the coaxial holes of the coil assembly and the magnetic conductor which are assembled together, then passing the connector through the positioning hole of the lug portion and connecting the connector with the valve body, the connector abutting against an upper wall of the lug portion; and turning the coil assembly along a radial direction of the coaxial holes, placing a first limiting portion of the coil assembly in a second limiting portion of the magnetic conductor, and placing a limiting end portion of the connector in an accommodating portion of the electromagnetic valve.

7. The electromagnetic valve according to claim 3, wherein the second plate body has a notch portion, wherein the notch portion has openings on upper and lower surfaces and a side wall surface of the second plate body, wherein the notch portion is recessed relative to the upper and lower surfaces and the side wall of the second plate body.

8. The electromagnetic valve according to claim 4, wherein the second plate body has a notch portion, wherein the notch portion has openings on upper and lower surfaces and a side wall surface of the second plate body, wherein the notch portion is recessed relative to the upper and lower surfaces and the side wall of the second plate body.

9. An electromagnetic valve, comprising a valve body, a coil assembly and a magnetic conductor, wherein at least part of the magnetic conductor is located between the coil assembly and the valve body; wherein the electromagnetic valve comprises a connector, and the connector is configured to connect the magnetic conductor with the valve body; wherein the connector comprises a limiting end portion and a connecting end portion; wherein the coil assembly comprises a main body portion, a connecting portion, an interface portion and a first recess, wherein the connecting portion comprises a first side wall and a second side wall, the first side wall intersects the second side wall, and the interface portion protrudes from the first side wall; wherein the first recess is formed on the connecting portion, the first recess is recessed relative to a lower wall of the connecting portion to form a first opening and is recessed relative to the second side wall of the connecting portion to form a second opening, and the first opening faces an upper wall of the magnetic conductor; wherein the electromagnetic valve has an accommodating portion, wherein a wall forming the accommodating portion comprises an inner wall of the first recess and the upper wall of the magnetic conductor, wherein the coil assembly and the magnetic conductor have at least two relative installation positions, wherein in at least one of the relative installation positions, the limiting end portion of the connector is located in the accommodating portion, and at least part of the connecting end portion of the connector extends into the valve body to be connected to the valve body;

wherein the coil assembly comprises a first limiting portion, the magnetic conductor comprises a second limiting portion, and the first limiting portion is located at the second limiting portion;

wherein the magnetic conductor comprises a first plate body, a second plate body and a third plate body, and the third plate body is configured to connect the first plate body with the second plate body, wherein along an axial direction of a first through hole of the main body portion, at least part of the first plate body is located between the valve body and the coil assembly, wherein the coil assembly abuts against a lower wall of the second plate body and an upper wall of the first plate body;

wherein the first plate body comprises a lug portion, the connector is directed through a hole of the lug portion, wherein at least part of the connecting end portion of the connector is connected with the valve body to fix the lug portion, and the upper wall of the magnetic conductor for forming the accommodating portion is an upper wall of the lug portion;

wherein the first limiting portion is located on upper wall of the connecting portion, the first limiting portion is formed as a protrusion, and the second limiting portion is formed as a recess, wherein along the axial direction of the first through hole, the first limiting portion protrudes toward second plate body from the upper wall of the connecting portion; wherein the second limiting portion is formed on the second plate body, the second limiting portion is recessed relative to the lower wall of the second plate body, and the second limiting portion has an opening on a lower surface of the second olate body; and wherein the first recess comprises a fourth side wall, wherein along a circumferential direction of the first through hole, the fourth side wall is closer to the first through hole than the first side wall, wherein the fourth side wall is located below the first side wall and the second side wall, wherein the second opening penetrates through a side wall of the connecting portion.

10. The electromagnetic valve according to claim 9, wherein the second plate body has a notch portion, wherein the notch portion has openings on upper and lower surfaces and a side wall surface of the second plate body, wherein the notch portion is recessed relative to the upper and lower surfaces and the side wall of the second plate body.

* * * * *